March 30, 1965 G. A. DESCHAMPS 3,176,119
ATTITUDE COMPUTER
Filed May 14, 1958 11 Sheets-Sheet 1

Inventor
GEORGES A. DESCHAMPS
By Philip M. Bolton
Attorney

Inventor
GEORGES A. DESCHAMPS
By Philip M. Bolton
Attorney

March 30, 1965 G. A. DESCHAMPS 3,176,119

ATTITUDE COMPUTER

Filed May 14, 1958 11 Sheets-Sheet 3

Inventor
GEORGES A. DESCHAMPS
By Philip M. Bolton
Attorney

Inventor
GEORGES A. DESCHAMPS
By Philip M. Bolton
Attorney

March 30, 1965 G. A. DESCHAMPS 3,176,119

ATTITUDE COMPUTER

Filed May 14, 1958 11 Sheets-Sheet 5

Inventor
GEORGES A. DESCHAMPS
By Philip M. Bolton
Attorney

Inventor
GEORGES A. DESCHAMPS
By Philip M. Bolton
Attorney

Inventor
GEORGES A. DESCHAMPS
By Philip M. Bolton
Attorney

March 30, 1965 G. A. DESCHAMPS 3,176,119

ATTITUDE COMPUTER

Filed May 14, 1958 11 Sheets-Sheet 8

Inventor
GEORGES A. DESCHAMPS
By Philip M. Bolton
Attorney

March 30, 1965 G. A. DESCHAMPS 3,176,119

ATTITUDE COMPUTER

Filed May 14, 1958 11 Sheets-Sheet 9

Inventor
GEORGES A. DESCHAMPS
By Philip M. Bolton
Attorney

Inventor
GEORGES A. DESCHAMPS
By Philip M. Bolton
Attorney

March 30, 1965 G. A. DESCHAMPS 3,176,119

ATTITUDE COMPUTER

Filed May 14, 1958 11 Sheets-Sheet 11

Inventor
GEORGES A. DESCHAMPS
By Philip M. Bolton
Attorney 3,176,119

ATTITUDE COMPUTER

Georges A. Deschamps, New York, N.Y., assignor to International Telephone and Telegraph Corporation, Nutley, N.J., a corporation of Maryland

Filed May 14, 1958, Ser. No. 736,439

10 Claims. (Cl. 235—151)

This invention relates to systems for determining and producing signals representative of the attitude of a vehicle with respect to a given frame of reference, and particularly to such systems using gyroscope sensors and determining the attitude of a vehicle with respect to a three-dimensional reference frame.

In the control and guidance of many vehicles, such as airplanes, missiles, artificial satellites, etc., it is important to determine the attitude or orientation of the vehicle with respect to a three-dimensional frame of reference, which frame may be fixed or rotating. One use for such information is in enabling an airplane or missile to maintain its proper orientation, either by pilot or human control or automatically. Another typical example of this is, of course, in inertial guidance systems, wherein, to determine the velocity and position of the vehicle in a given reference frame, translational accelerations must be resolved in accordance with the attitude of the vehicle within said frame.

It has heretofore been proposed in inertial guidance systems for airplanes and missiles to employ a platform on which the accelerometers are mounted, the platform being maintained stable with respect to a fixed reference frame or with respect to a reference frame using the earth's vertical as one of its axes. Despite rotations of the vehicle, the orientation of the platform in such inertial guidance systems is always kept fixed with respect to the reference frame, and the attitude of the vehicle may be determined by comparing its attitude with that of the stabilized platform. To maintain the stability of such a platform with respect to its reference frame has required a complex structure utilizing a number of gyros, a number of gimbals, one mounted upon another, driving servos, and analog feedback loops utilizing analog information from the gyros to drive the motors and maintain the platform stable. Such stabilized platform systems are mechanically complex and present many difficulties both in manufacture and use.

An object of the present invention is the provision of an improved system for determining and producing signals representing the attitude of a vehicle with respect to a reference frame, particularly a three-dimensional frame.

Another object of the present invention is the provision of such a system in which the stabilized platform is dispensed with and in which information as to the attitude of the vehicle is stored in a suitable storage device, and this information is changed as the vehicle performs rotations within the reference frame so that the stored information continuously represents the attitude of the vehicle with respect to said frame.

In accordance with a main feature of the present invention, there is provided a system for providing information representing the attitude of a body with respect to a reference spatial frame comprising means for sensing rotations of said body with respect to said reference frame, means coupled to said sensing means for producing signals representative of said rotation, means for storing information representative of the attitude of said body with respect to said reference frame, and means coupled to said sensing means for changing the information in said storage means in accordance with the signals from said sensing means to thereby continuously provide stored information representative of the attitude of said body with respect to said reference frame.

In accordance with another more specific feature of the present invention, rotation-sensing devices, such as gyros, are arranged with respect to the body, for example by being mechanically fixed thereto, so that their rotation-sensing axes are fixed with respect to the body of the vehicle whereby, as the vehicle rotates with respect to the reference frame, signals representing these rotations are produced, these signals being fed to a computer which computes the values of these rotations with respect to the predetermined frame of reference and stores this information, the stored information representing the attitude of the vehicle with respect to the reference frame.

In accordance with a further aspect of the present invention, the computer has stored therein numerical information representative of the attitude of the vehicle with respect to the reference frame, and from the rotation-sensing devices, signals are obtained representing predetermined, for example, equal, increments of rotation about their sensitive axes, these incremental signals being used to vary the stored information.

Other and further objects and features of the present invention will become apparent, and the foregoing will be better understood with reference to the following description of embodiments thereof, reference being had to the drawings, in which:

FIGS. 1 and 1*a* illustrate a spatial orientation of a body with respect to a reference frame and the orientation of gyro sensors in said body respectively;

Figure 4A:
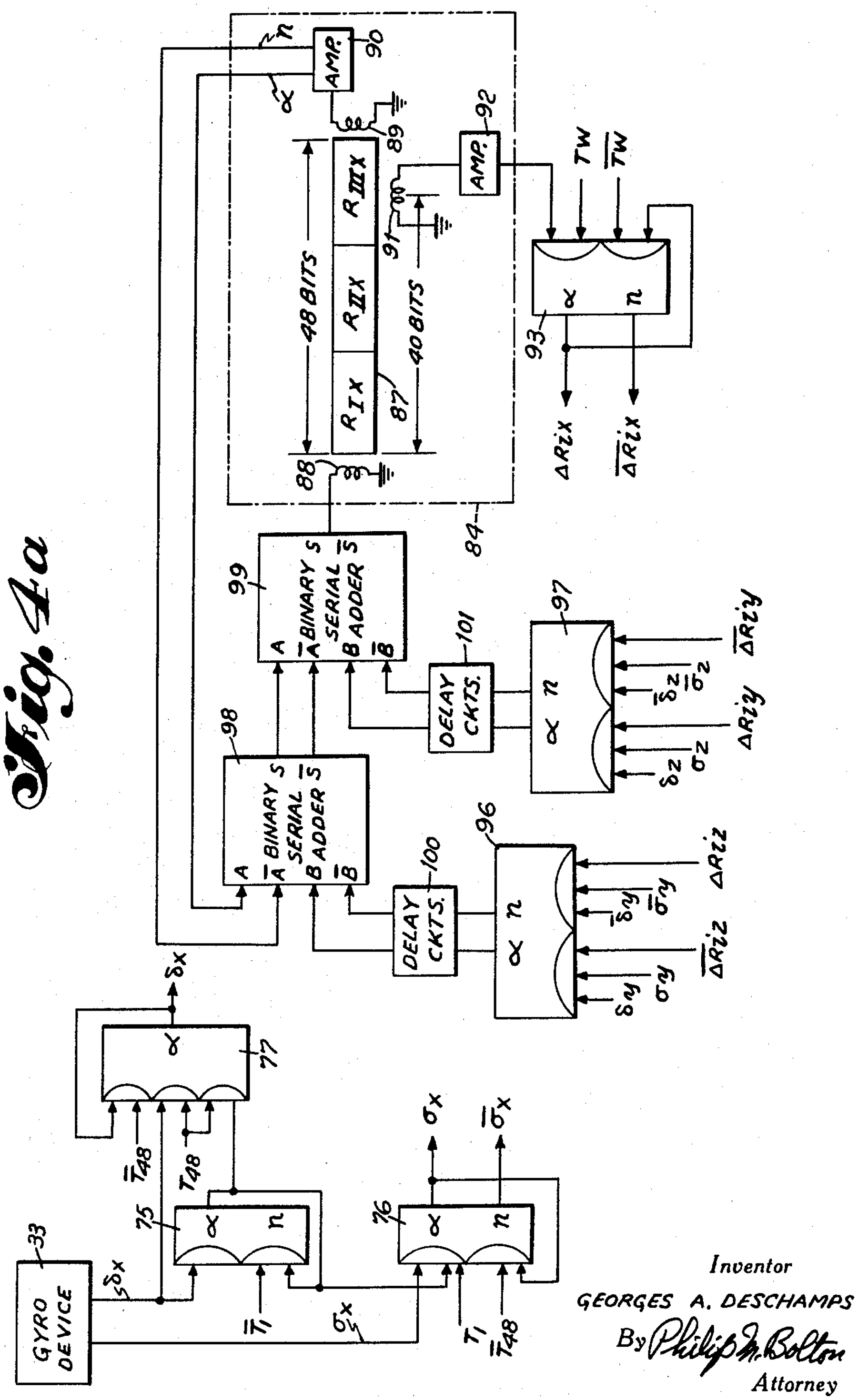
Figure 5A:
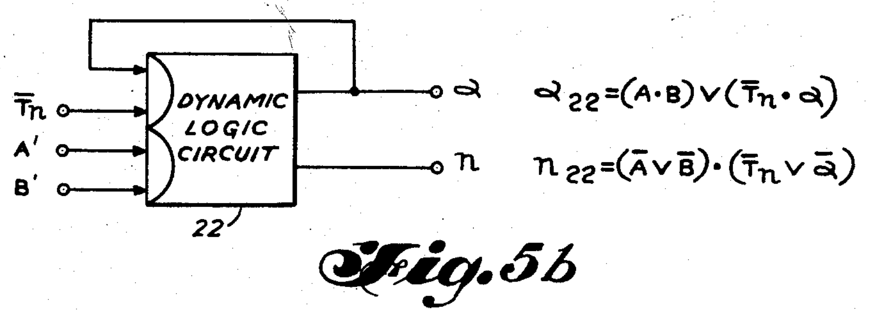
Figure 6:
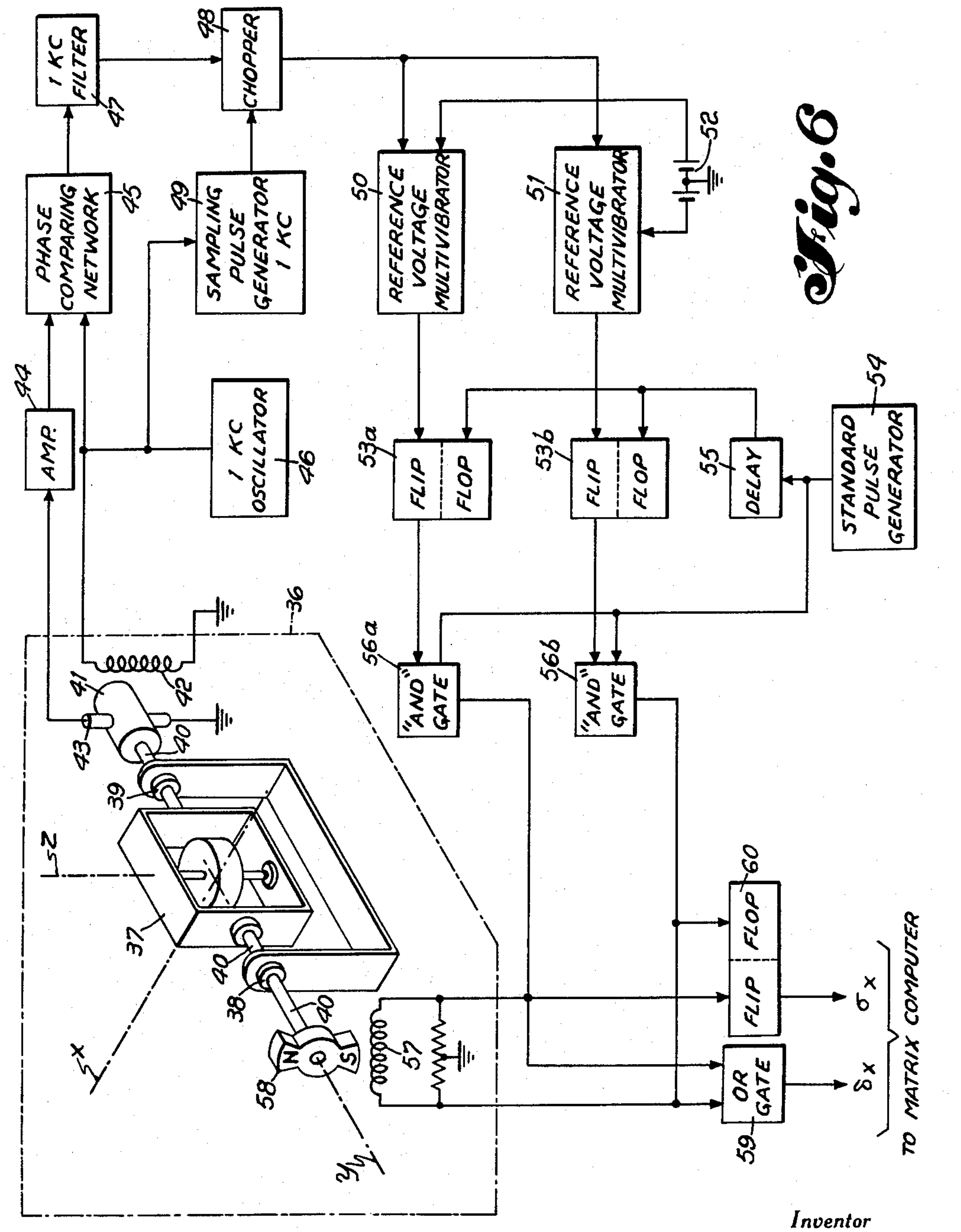
Figure 7:
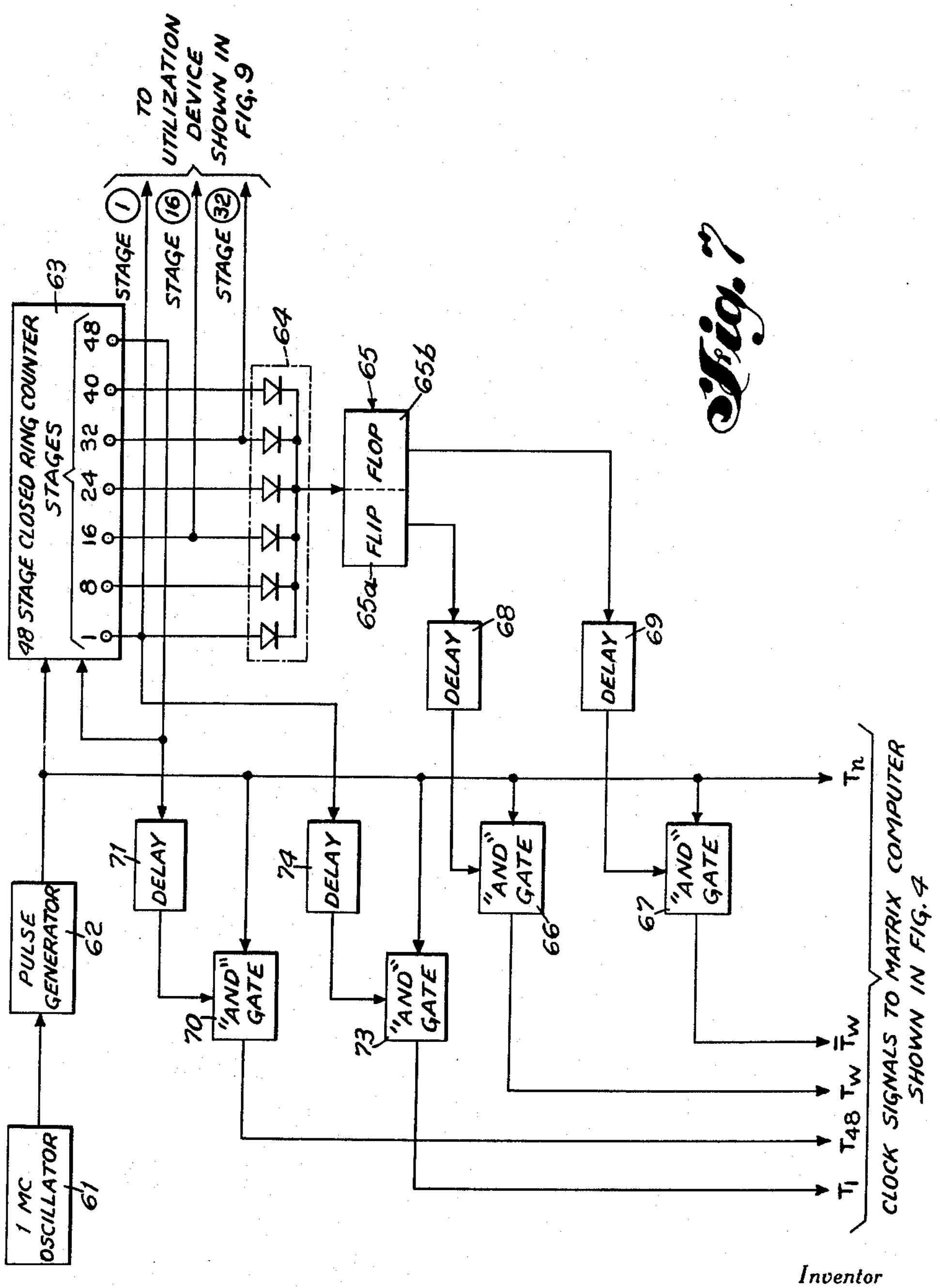
Figure 8:
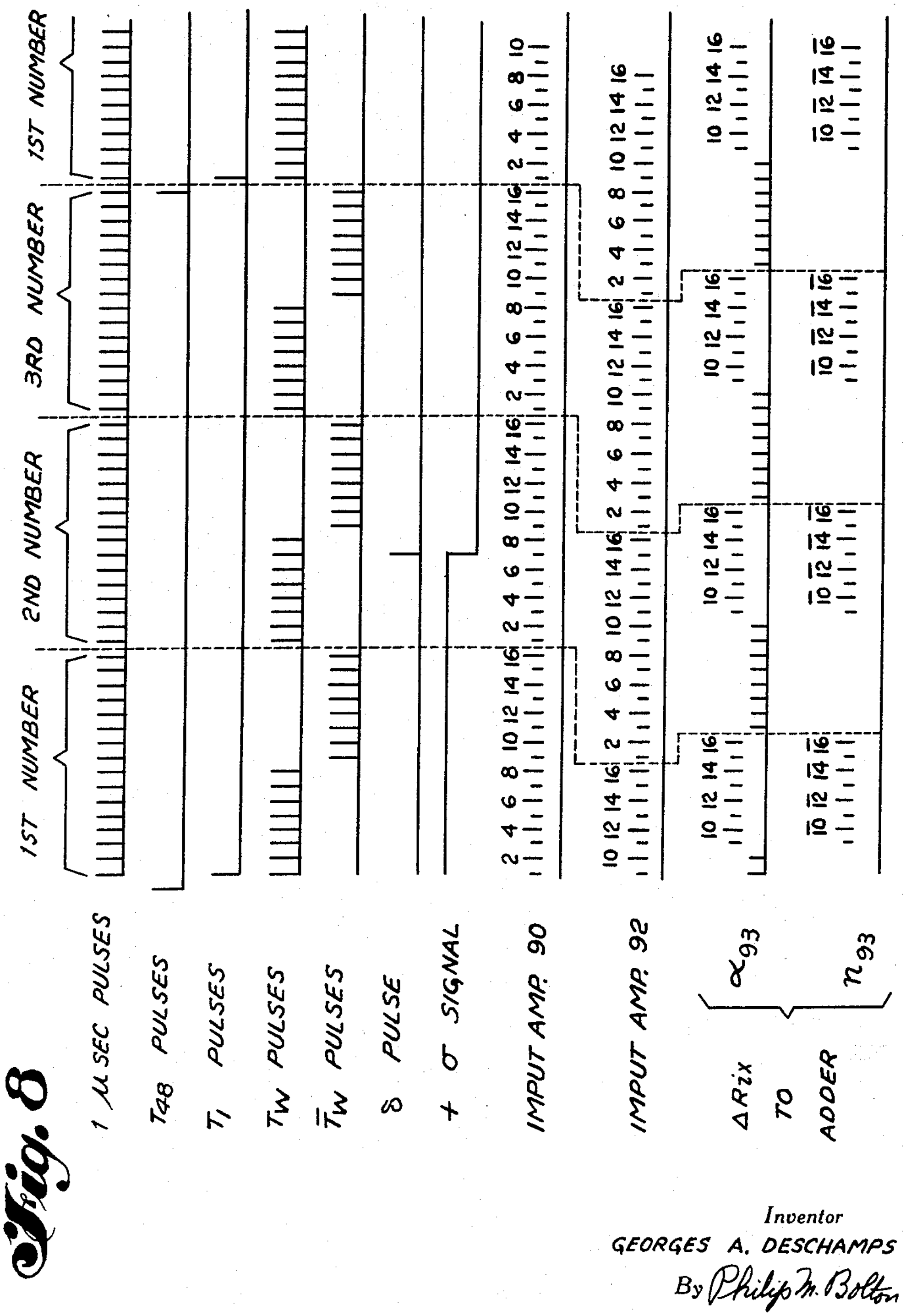
Figure 9:
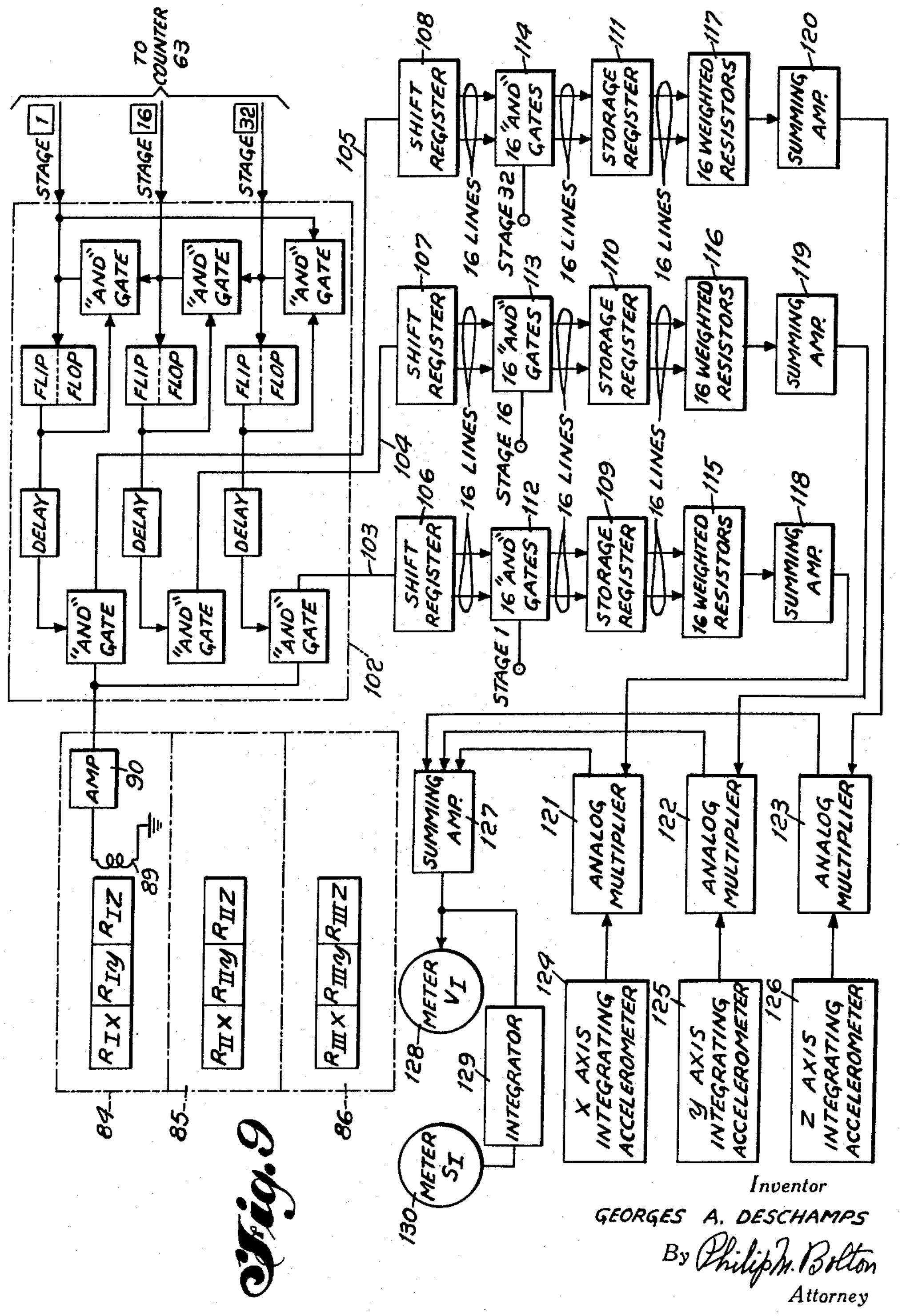

FIGS. 4*a*, *b* and *c* represent a block diagram and partial schematic of a matrix computer employing dynamic logic circuitry for computing nine of said numbers;

FIGS. 5*a*, *b* and *c* show diagrams and waveforms from which an understanding of the operation of a typical dynamic logic circuit may be had;

FIG. 6 shows a partially pictorial view and block diagram of a gyroscope device for providing pulse signals each indicative of a given angle of rotation and a signal indicative of the direction of said rotation;

FIG. 7 is a block diagram of the electronic clock for providing numerous clock pulses;

FIG. 8 is a waveform diagram showing clock pulses and others employed in the matrix computer; and FIG. 9 is a block diagram of a utilization device for determining the position of a body in the reference frame employing outputs from said matrix computer.

Figures 1, 1A:
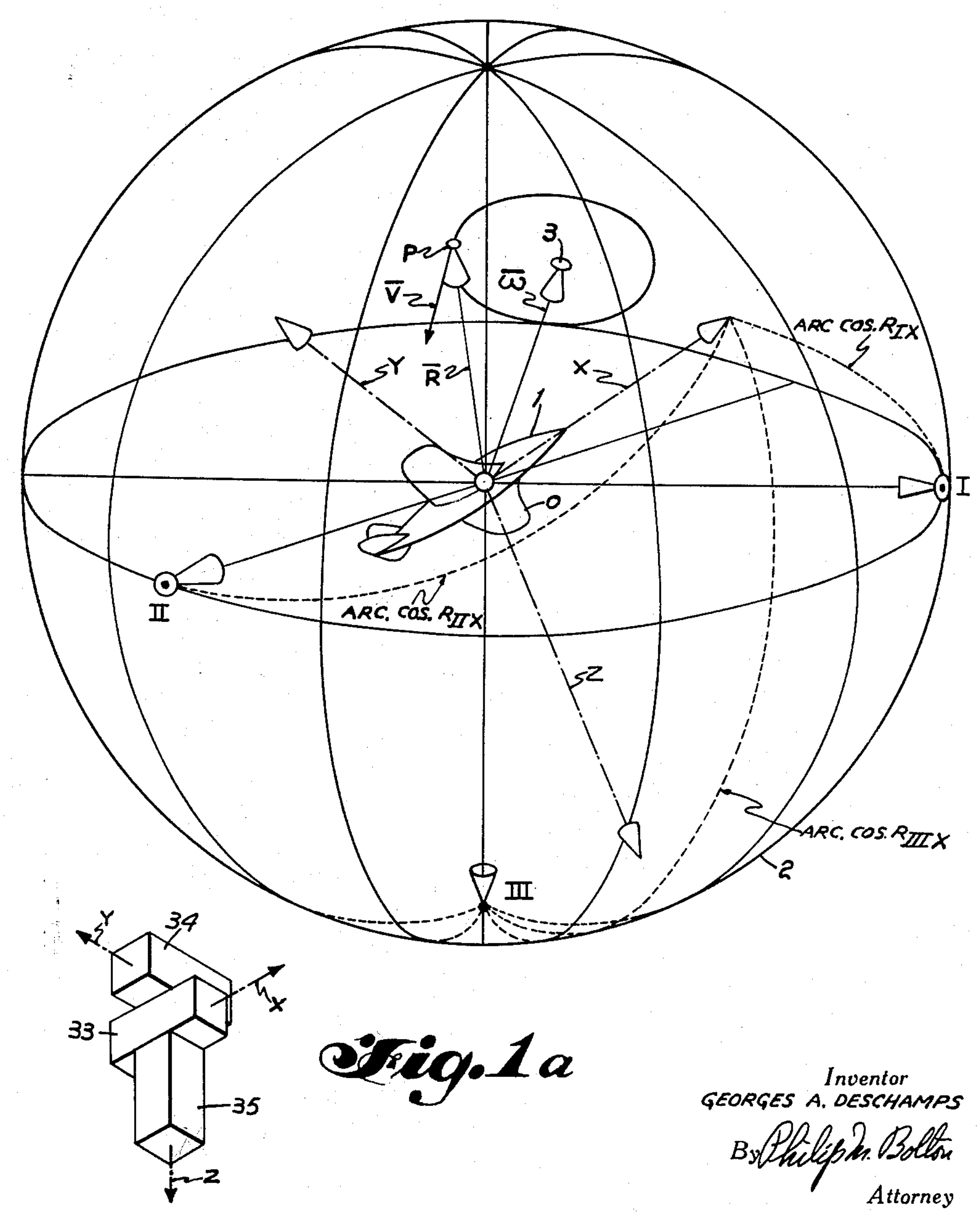

Turning first to FIG. 1, there is shown a spatial diagram from which an understanding of the theory of this invention may be had. A body, such as a missile or an aircraft, 1 is shown having axes *x*, *y*, and *z* rigidly fixed thereto and extending from the origin O of sphere 2, which is preferably the center of gravity of the body 1, to the surface of sphere 2. Assume that body 1 rotates in three-dimensional space at an angular rate $\omega$ having components in the *x*, *y*, and *z* directions of $\omega_x$, $\omega_y$, and $\omega_z$. Furthermore, let the angular rate $\omega$ be represented by a vector $\bar{\omega}$ extending from the origin of sphere 2, its line of direction intercepting the surface of sphere 2 at point 3 which is the center of a circle drawn on the surface of sphere 2 and passing through some point P whose location on the surface of sphere 2 relative to the origin, O, may be represented by unit vector $\bar{R}$. Obviously, the instantaneous translational velocity of point P on the surface of sphere 2 may be represented by the vector cross product $\bar{\omega}\times\bar{R}$ as follows:

$$\bar{V}=\bar{\omega}\times\bar{R} \quad \text{(A)}$$

Since $\bar{\omega}$ may be represented by its components in the directions $x$, $y$, and $z$, namely, $\omega_x$, $\omega_y$, and $\omega_z$, and since $\overline{R}$ may be represented by its components in the directions $x$, $y$, and $z$, namely $R_x$, $R_y$, and $R_z$, the vector cross product may be written as follows:

(B)
$$\overline{V}=(\omega_y R_z-\omega_z R_y)i+(\omega_z R_x-\omega_x R_z)j+(\omega_x R_y-\omega_y R_x)k$$

In matrix notation the above expanded cross product may be represented by a matrix multiplication as follows:

(C)
$$\begin{bmatrix} V_x \\ V_y \\ V_z \end{bmatrix}=\begin{bmatrix} 0 & -\omega_z & \omega_y \\ \omega_z & 0 & -\omega_x \\ -\omega_y & \omega_x & 0 \end{bmatrix}\begin{bmatrix} R_x \\ R_y \\ R_z \end{bmatrix}$$

and the rotation rate matrix may be simplified for expression by the following identity:

(D)
$$[\omega]=\begin{bmatrix} 0 & -\omega_z & \omega_y \\ \omega_z & 0 & -\omega_x \\ -\omega_y & \omega_x & 0 \end{bmatrix}$$

Referring again to FIG. 1, we will now express the velocity of point P in terms of components along axes I, II, and III of a reference or inertial frame of reference which is fixed in space and does not rotate as body 1 rotates. Obviously, this may be accomplished by expressing rotational vector $\overline{\omega}$ in terms of rotational components about axes I, II, and III and expressing vector $\overline{R}$ in terms of its projections along axes I, II, and III to yield a matrix equation for the velocity of point P in terms of its components in the directions of axes I, II, and III, denoted $V_I$, $V_{II}$, and $V_{III}$ having the same form as the matrix equation above. However, this obvious method will not be employed in this invention, but rather, another method will be employed whereby the matrix $[\omega]$ expressing the rotational rate of point P about axes $x$, $y$, and $z$ will be retained. This is necessary because in practice the rotation rates $\omega_x$, $\omega_y$, and $\omega_z$ are readily available as the outputs from gyroscope devices fixed to the body 1 and oriented along the lines of axes $x$, $y$, and $z$ of body 1, as shown in FIG. 1*a*. In order to employ the $[\omega]$ matrix, each of the components $R_x$, $R_y$, and $R_z$ must be expressed in terms of their projections on axes I, II, and III to yield the following matrix equation expressing the projections of each of the velocity vectors $V_x$, $V_y$, and $V_z$ on the axes I, II, and III:

(E)
$$\begin{bmatrix} V_{Ix} & V_{IIx} & V_{IIIx} \\ V_{Iy} & V_{IIy} & V_{IIIy} \\ V_{Iz} & V_{IIz} & V_{IIIz} \end{bmatrix}=[\omega]\begin{bmatrix} R_{Ix} & R_{IIx} & R_{IIIx} \\ R_{Iy} & R_{IIy} & R_{IIIy} \\ R_{Iz} & R_{IIz} & R_{IIIz} \end{bmatrix}$$

The above matrix equation may be written in another algorithm form for convenience of discussion as follows:

(F)
$$R=[\omega]R$$

The above algorithm form of the matrix equation may be put in incremental form by rewriting it as the following approximation:

(G)
$$\Delta R/\Delta t=[\omega]R$$

and since $[\omega]\Delta t$ is equivalent to $[\delta]$ which is the matrix form representing an increment of angle by the path of point P on the surface of sphere 2 as subtended from the origin O during the interval $\Delta t$, the above may be expressed as follows:

(H)
$$\Delta R=[\delta]R$$

Since the matrix $[\delta]$ may be taken similar to the matrix $[\omega]$ to a first approximation it follows:

(I)
$$[\delta]=\begin{bmatrix} 0 & -\delta_z & \delta_y \\ \delta_z & 0 & -\delta_x \\ -\delta_y & \delta_x & 0 \end{bmatrix}$$

Another more accurate version of the $[\delta]$ matrix which reduces truncation error is as follows:

$$[\delta]\begin{bmatrix} \frac{(-\delta_x)^2}{2} & \delta_z & -\delta_y \\ -\delta_z & \frac{(-\delta_x)^2}{2} & \delta_x \\ \delta_y & -\delta_x & \frac{(-\delta_z)^2}{2} \end{bmatrix}$$

The truncation error exists because the interval $\Delta t$ is finite and during that interval a rotation of body 1 about, say for example, the $x$ axis, will cause a third order change in the value of the projection of the veitor $\overline{R}$ on the $x$ axis, denoted herein as $R_x$, and, thus, a third order change in the value of the projection $R_x$ on the reference axis I, II and III, denoted herein as $R_{Ix}$, $R_{IIx}$, and $R_{IIIx}$, respectively. Obviously, even more accurate matrices for $[\delta]$ could be employed in place of the approximate matrix shown in Equation I or in place of the third order correction matrix shown directly above, however, in order to simplify the embodiment of this invention herein described, which is adequate for most applications, use of the simpler matrix shown in Equation I will be disclosed in detail.

Referring again to Equation H, an algorithm equation for $\Delta R$ may be written in matrix form as follows:

(J)
$$\begin{bmatrix} \Delta V_{Ix} & \Delta V_{IIx} & \Delta V_{IIIx} \\ \Delta V_{Iy} & \Delta V_{IIy} & \Delta V_{IIIy} \\ \Delta V_{Iz} & \Delta V_{IIz} & \Delta V_{IIIz} \end{bmatrix}=[\delta]\begin{bmatrix} R_{Ix} & R_{IIx} & R_{IIIx} \\ R_{Iy} & R_{IIy} & R_{IIIy} \\ R_{Iz} & R_{IIz} & R_{IIIz} \end{bmatrix}$$

Next, performing the matrix multiplication on the right-hand side of the above matrix equation, the following nine simultaneous equations, one for each $\Delta R$, are obtained:

(K)
$$\Delta R_{Ix}=0-\delta_z.R_{Iy}+\delta_y.R_{Iz}$$
$$\Delta R_{IIx}=0-\delta_z.R_{IIy}+\delta_y.R_{IIz}$$
$$\Delta R_{IIIx}=0-\delta_z.R_{IIIy}+\delta_y.R_{IIIz}$$
$$\Delta R_{Iy}=\delta_z.R_{Ix}+0-\delta_x.R_{Iz}$$
$$\Delta R_{IIy}=\delta_z.R_{IIx}+0-\delta_x.R_{IIz}$$
$$\Delta R_{IIIy}=\delta_z.R_{IIIx}+0-\delta_x.R_{IIIz}$$
$$\Delta R_{Iz}=-\delta_y.R_{Ix}+\delta_x.R_{Iy}+0$$
$$\Delta R_{IIz}=-\delta_y.R_{IIx}+\delta_x.R_{IIy}+0$$
$$\Delta R_{IIIz}=\delta_y.R_{IIIx}+\delta_x.R_{IIIy}+0$$

If each value of R at an instant of time $t$ may be expressed by matrix $(R)_t$, then matrix $(R)_{t+1}$ is expressed as follows:

(L)
$$(R)_{t+1}=(R)_t+(\Delta R)_t$$

Each value of R at the time $t+1$, denoted generally as $(R_{ij})_{t+1}$, may be expressed by one of the following nine simultaneous equations:

(M)
$$(R_{Ix})_{t+1}=(R_{Ix})_t+(\Delta R_{Ix})_t$$
$$(R_{IIx})_{t+1}=(R_{IIx})_t+(\Delta R_{IIx})_t$$
$$(R_{IIIx})_{t+1}=(R_{IIIx})_t+(\Delta R_{IIIx})_t$$
$$(R_{Iy})_{t+1}=(R_{Iy})_t+(\Delta R_{Iy})_t$$
$$(R_{IIy})_{t+1}=(R_{IIy})_t+(\Delta R_{IIy})_t$$
$$(R_{IIIy})_{t+1}=(R_{IIIy})_t+(\Delta R_{IIIy})_t$$
$$(R_{Iz})_{t+1}=(R_{Iz})_t+(\Delta R_{Iz})_t$$
$$(R_{IIz})_{t+1}=(R_{IIz})_t+(\Delta R_{IIz})_t$$
$$(R_{IIIz})_{t+1}=(R_{IIIz})_t+(\Delta R_{IIIz})_t$$

In this invention the typical coefficients $R_{ij}$ expressed in Equations M will be represented as binary numbers in a computer. Thus, nine such numbers will be represented in the computer in binary form and gyroscope signals $\delta_x$, $\delta_y$, and $\delta_z$ will represent equal increments of angles of rotation of body 1 about it axes $x$, $y$, and $z$ (see FIG. 1). These increments are chosen to be a power of 2 so that multiplication of $R_{ij}$ by $\delta_x$, $\delta_y$, or $\delta_z$, shown in Equations K, becomes a shifting process to shift each value of $R_{ij}$ a number of places determined by said power when multiplied by a $\delta$ pulse from a gyroscope. In the embodiment of this invention herein described, a single $\delta$ pulse from a gyroscope has been chosen for purposes of illustration to indicate a rotational angle of $2^{-6}$ radians. Obviously, system accuracy can be improved by decreasing the angle represented by a single $\delta$ pulse from a gyroscope; for example, each pulse might represent a rotation of body 1 about one of its axes of $2^{-13}$ radians.

Figure 2:
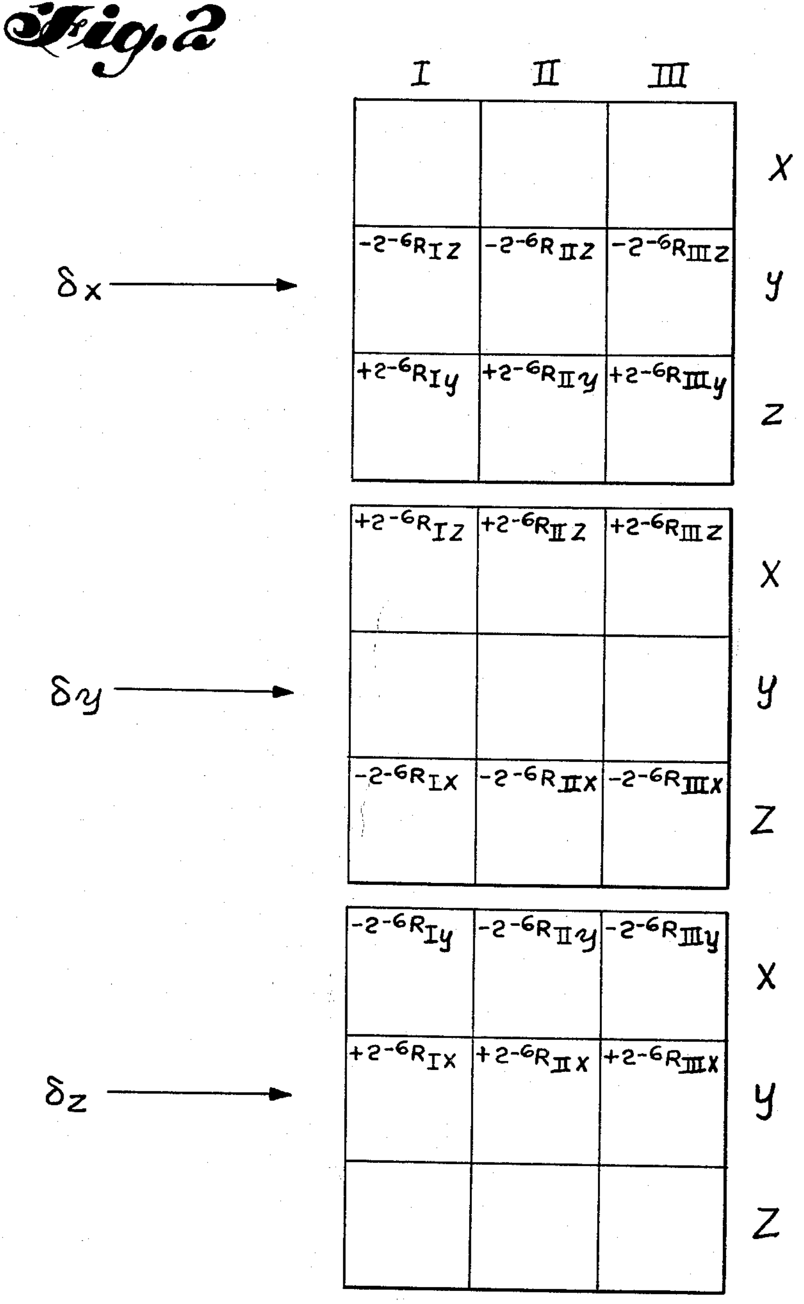
FIG. 2 is a chart showing the interrelationship between stored numbers as controlled by gyro signals.

The effect of a $\delta$ pulse representing an increment of rotation of the *x*, *y*, or *z* axes upon the nine coefficients $R_{ij}$ expressed in Equations M is charted in FIG. 2. It will be seen from the chart that a $\delta_x$ pulse will produce no change in the $R_{Ix}$, $R_{IIx}$, $R_{IIIx}$ coefficients. It will further be seen that for the $R_{Iy}$ coefficient, there is a subtraction therefrom of a weighted portion of the value of the $R_{Iz}$ coefficient. The same pulse will cause an addition to the $R_{Iz}$ coefficient equal to the same fraction of the $R_{Iy}$. Further inspection of the chart in FIG. 2 will show that for the same $\delta_x$ pulse, there is a similar subtraction from the $R_{IIy}$ and $R_{IIIy}$ coefficients and a similar addition to the $R_{IIz}$ and $R_{IIIz}$ coefficients. For a $\delta_y$ pulse, representing an increment of rotation around the *y* axes, there is a similar process of addition and subtraction occurring between the $R_{ix}$ coefficients and the $R_{iz}$ coefficients and for a $\delta_z$ pulse, there is a similar subtraction and addition between the $R_{ix}$ and $R_{iy}$ coefficients as likewise shown in the chart.

In the above chart, it is presupposed that the increments of rotation, that is, the $\delta_x$, $\delta_y$, and $\delta_z$ are positive. If they are negative, the signs inside the boxes are reversed. After the computer for carrying out the functions indicated in the chart, FIG. 2, has been initially aligned, the successive $\delta$ pulses will change the $R_{ij}$ coefficients in the computer in accordance with the rotation of the *x*, *y*, and *z* axes so that the nine coefficients will continuously represent the attitude of the *x*, *y*, and *z* axes with respect to the reference frame I, II, and III axes (see FIG. 1).

Figure 3:
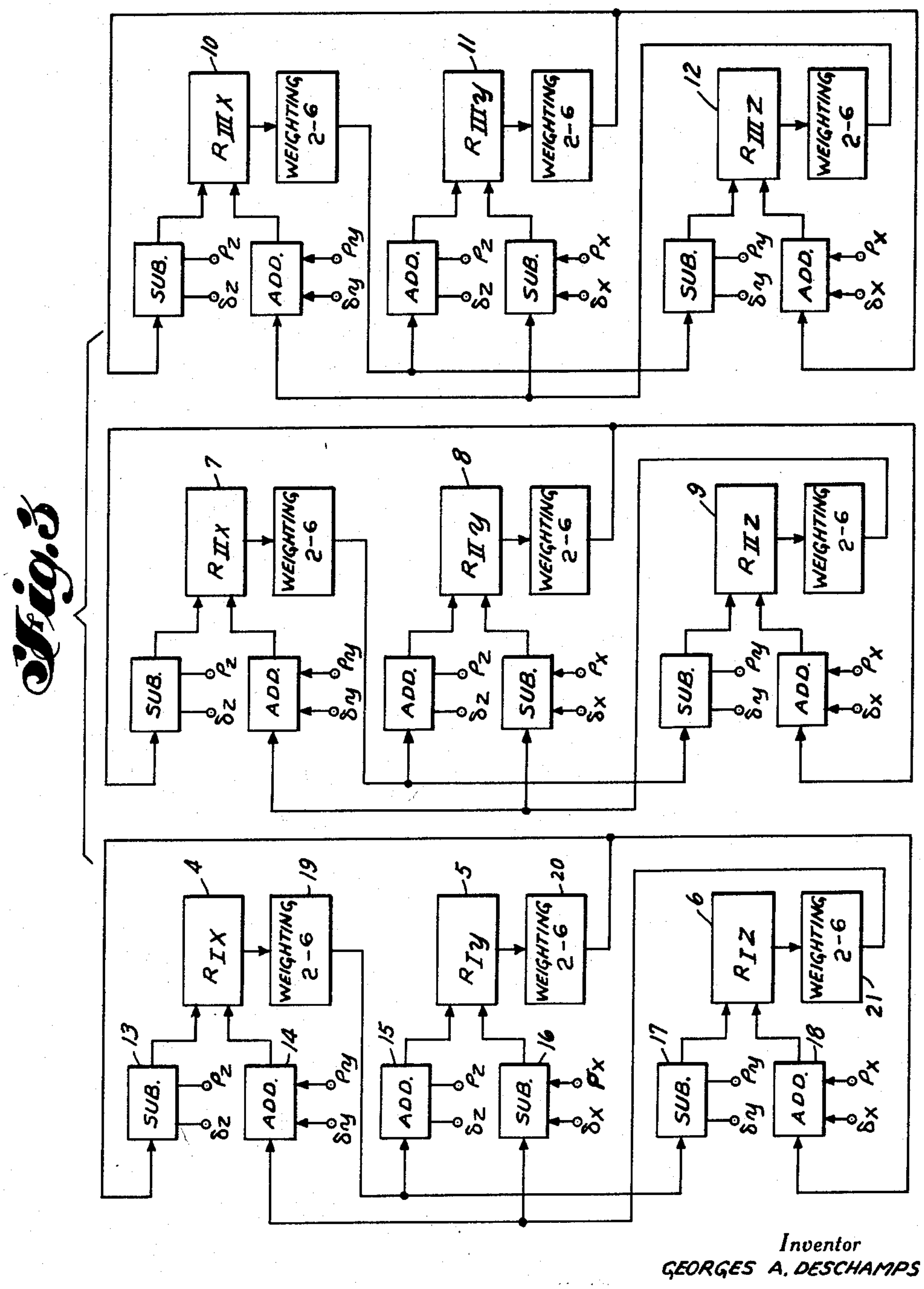
FIG. 3 is a block diagram showing the general method of computing and storing said numbers.

Generally, the computer will perform the operations of FIG. 2 by apparatus which performs the functions indicated in FIG. 3. Referring now to FIG. 3, each one of the $R_{ij}$ coefficients, representing nine numbers, may be stored numbers in a separate register designated as 4 to 12, respectively. These may be in binary form and the registers may be, for example, either magnetic drums, pulse recirculating storage registers, etc. Since the circuitry connecting registers 4, 5, and 6 is the same as that connecting 7, 8, and 9, or 10, 11, and 12, a brief description of the circuitry connecting registers 4, 5, and 6 will suffice. When a $\delta$ pulse arrives accompanied by its associated $\rho$ signal which indicates the sign of the $\delta$ pulse, and said $\rho$ signal indicates positive, there is an addition made to one of the registers and a subtraction from another of the registers. This addition and subtraction may of course be reversed if said $\rho$ signal indicates negative. Such additions and subtractions to the number in each register 4, 5, and 6 are made by devices 13 to 18, each of which is designated "subtract" or "add" to indicate its function in response to the $\delta$ pulse controlling it, when that $\delta$ pulse is positive as indicated by its associated $\rho$ signal. The inputs to devices 13 to 18, which are indicative of the numbers to be added or subtracted to registers 4, 5, or 6, are obtained from weighting devices 19, 20, and 21 coupled to registers 4, 5, and 6, respectively. The function of each of these weighting devices is to read the number in the register to which it is coupled without altering said number and to weight the read number by effectively multiplying it by a factor equivalent to the value of a single $\delta$ pulse. For example, in the embodiment of this invention herein described, each $\delta$ pulse represents a rotation of body 1 about one of its axes of $2^{-6}$ radians and the numbers in registers 4 to 12 are represented in binary form by 16 binary bits; thus, the action of each of weighting devices 19, 20, and 21 is to alter the significance of each binary bit by reducing its significance six binary places. In other words, a number in a register represented in binary notation, least significant bit first, as 1010110010110011 would be weighted as 0010110011.

With the above being understood, it can readily be seen how the system of FIG. 3 operates in accordance with the chart of FIG. 2 when a $\delta$ pulse is received. Assuming for the moment that a positive $\delta_x$ pulse is received, this will actuate the "subtract" device 16 and the "add" device 18 feeding registers 5 and 6. A weighted portion of the coefficient $R_{Iz}$ in register 6 will be subtracted from the coefficient $R_{Iy}$ in register 5 while at the same time, the same $\delta_x$ pulse will actuate device 18 causing a weighted portion of $R_{Iy}$ in register 5 to be added to the coefficient $R_{Iz}$ in register 6. It will be seen that this corresponds to the operations indicated by the chart in FIG. 2. The same actions, in response to a $\delta_x$ pulse, will occur between registers 8 and 9 and 11 and 12, thereby changing the value of their corresponding coefficients. For a $\delta_y$ pulse, the "add" and "subtract" devices 14 and 17 will operate in accordance with the indication of FIG. 2, and for a $\delta_z$ pulse, devices 13 and 15 will operate in accordance with the corresponding indications of FIG. 2. The additions and subtractions produced by the $\delta$ pulses in registers 4, 5, and 6, as hereinabove described, will also occur in registers 7 through 12 in a similar manner as indicated in the chart of FIG. 2. Therefore, assuming that the registers are initially aligned so that the $R_{ij}$ coefficients properly represent the orientation of the *x*, *y*, and *z* axes, with respect to the reference frame, thereafter, as rotations of the body about axes *x*, *y*, *z* occur, the registers will change as heretofore indicated and continue to show the orientation of the *x*, *y*, and *z* axes with respect to the reference frame.

The various functions indicated in FIG. 3 may be performed in many ways using, for example, static or dynamic logic circuitry. The system shown in FIG. 3 has many redundancies and equipment, such as a multiplicity of adder-subtracters and registers, etc., many of which can be eliminated in a more sophisticated arrangement. One form of such an arrangement is described in FIG. 4 wherein is shown a matrix computer comprising dynamic logic circuits controlled by various timing pulses from an electronic clock to perform the functions hereinabove described with reference to FIG. 3, and three magnetostrictive storage devices to store the nine coefficients $R_{ij}$ in serial binary form and responsive to $\delta_x$, $\delta_y$, and $\delta_z$ pulses from gyroscope devices fixed to the *x*, *y*, and *z* axes of a body, such as shown in FIG. 1. These pulses from the gyroscope devices initiate additions to and subtractions from the nine coefficients $R_{ij}$ as prescribed by the nine Equations M and shown by the chart in FIG. 2.

Figure 4B:
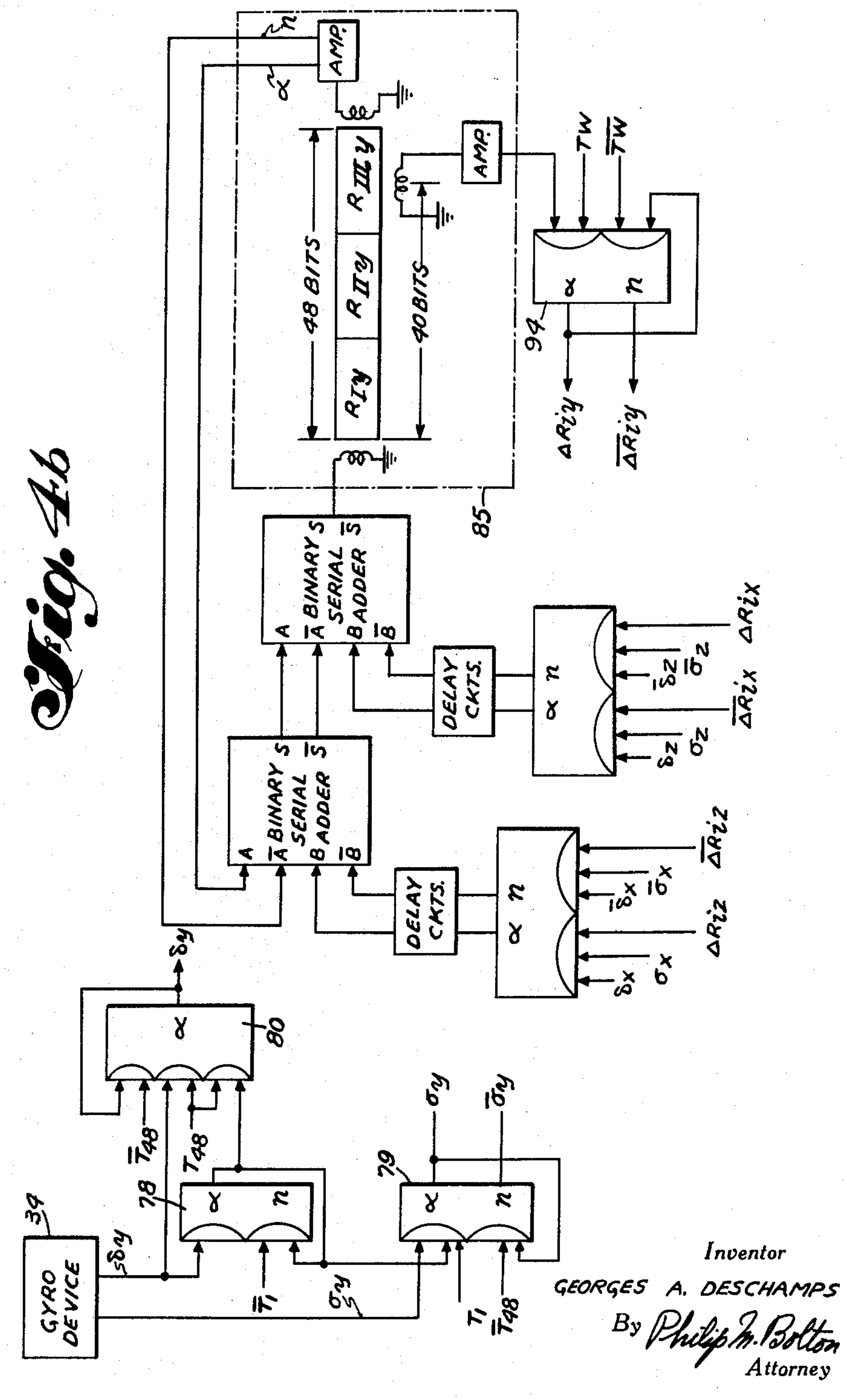
Figure 4C:
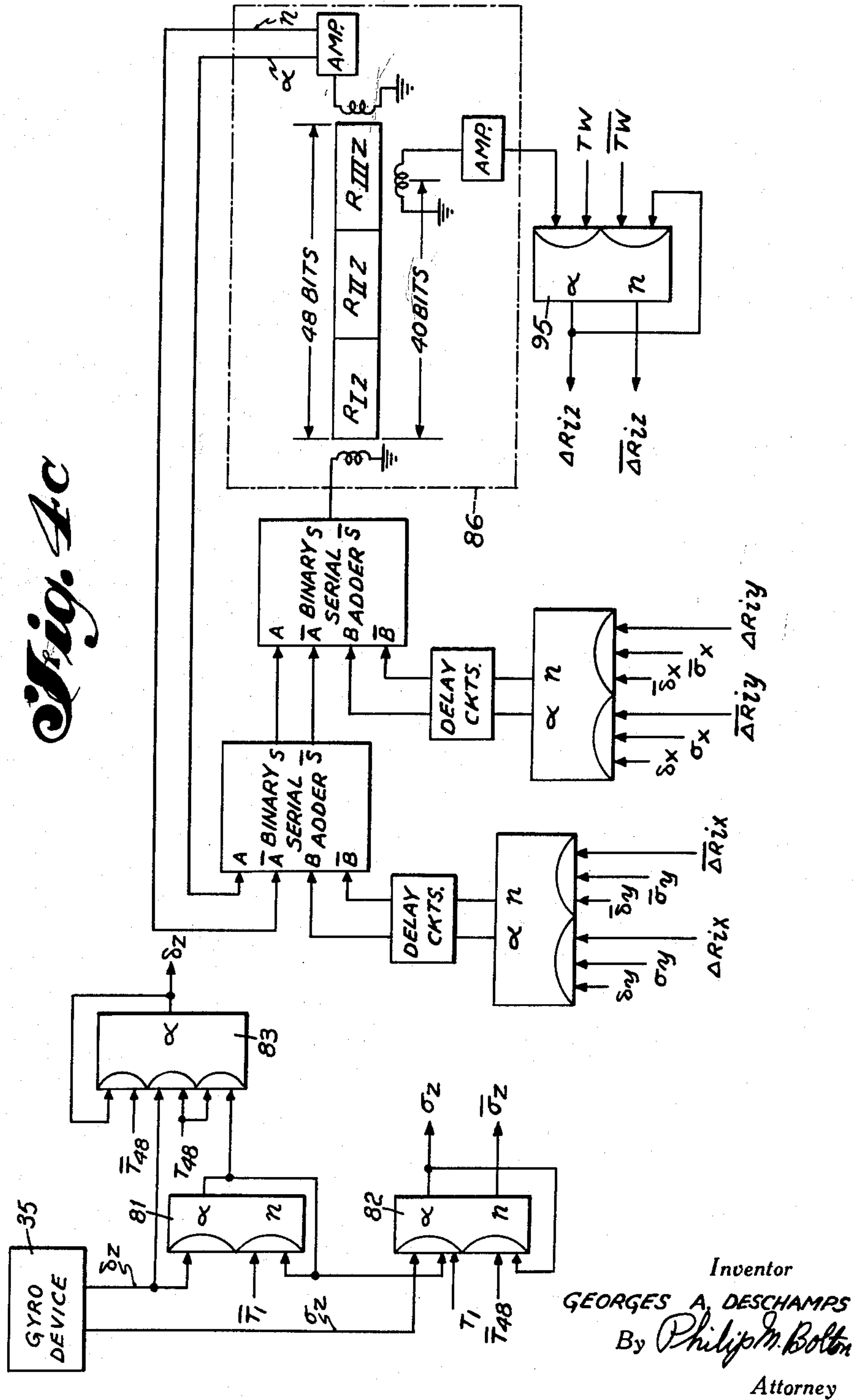
Figures 5B, 5C:
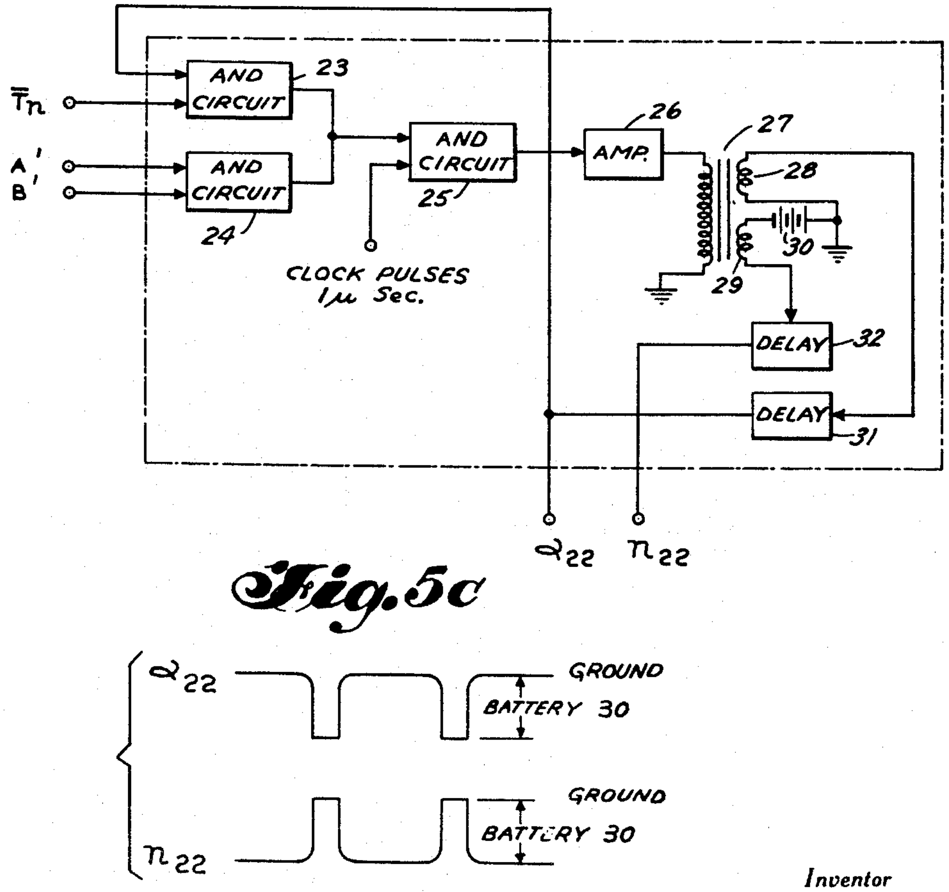

The operation of a typical one of the numerous dynamic logic circuits comprising the matrix computer shown in FIGS. 4*a*, 4*b* and 4*c* can be understood with reference to the details of such a circuit shown in FIGS. 5*a*, 5*b*, and 5*c*, while the operation of a typical one of the gyroscope devices shown in FIGS. 4*a*, 4*b* and 4*c* may be understood with reference to the details of such a device shown in FIG. 6, and the operation of the electronic clock may be followed by reference to FIG. 7, which is a system diagram, and FIG. 8, which depicts various clock output waveforms and matrix computer waveforms.

Referring next to FIG. 5*a*, there is shown a typical dynamic logic circuit 22 which is typical of those represented in FIGS. 4*a*, 4*b* and 4*c* having an assertive output $\alpha_{22}$ and a negative output $\eta_{22}$. The external inputs to circuit 22 are A′, B′, and $\overline{T}_n$, and the logic performed by this circuit is expressed by the equations for $\alpha_{22}$ and $\eta_{22}$ shown at FIG. 5*a*. The same dynamic logic circuit 22 is shown in detail in FIG. 5*b* comprising input "and" circuits 23 and 24, each of which produces a single pulse output in response to simultaneously receiving pulses from two different sources. The "and" circuit 23 is fed $\alpha_{22}$ and $\overline{T}_n$ pulses, while "and" circuit 24 is fed A′ and B′ pulses.

The outputs of circuits 23 and 24 are coupled together and fed to a similar "and" circuit 25 which also is fed one microsecond clock pulses from the electronic clock described herein with reference to FIG. 7 so that said clock pulses appear at the output of circuit 25 when they are in coincidence with the output of circuits 23 or 24. The output of "and" circuit 25 is fed to amplifier 26 whose pulse output is fed to transformer 27 having two secondary windings 28 and 29 coupled together by battery 30 one terminal of which is grounded. The outputs from windings 28 and 29 are fed to delay circuits 31 and 32, respectively, serving to delay pulses from their respective coils to yield output pulses $\alpha_{22}$ and $\eta_{22}$ so that they are synchronized with the next clock pulse. A waveform diagram of $\alpha_{22}$ and $\eta_{22}$ is shown in FIG. 5c from which it may be seen that while $\alpha_{22}$ is at ground potential between pulses, $\eta_{22}$ is at battery 30 voltage and subsequently when $\alpha_{22}$ swings toward battery 30 voltage in response to a pulse output from amplifier 26, $\eta_{22}$ swings toward ground. In other words, an approximate ground potential output at terminal $\alpha_{22}$ indicates that the logic equation for $\alpha_{22}$ shown in FIG. 5a is not satisfied whereas battery 30 voltage output at terminal $\alpha_{22}$ indicates that the logic equation is satisfied. On the other hand, the converse of these conditions exists at terminal $\eta_{22}$.

Consider next the operation of a typical one of the gyroscope devices 33, 34, or 35 shown in FIGS. 4a, 4b and 4c, say for example device 33 which produces $\delta_x$ pulses and a $\sigma_x$ signal in response to rotations of body 1 about its $x$ axis. Referring to FIG. 6, there are shown the details of device 33 comprising a single degree of freedom gyroscope system 36 preferably fixed to body 1 of FIG. 1 so that a rotation of body 1 about its $x$ axis causes the gyroscope housing 37 to precess on bearing 38 and 39 supporting axle 40 which is orientated in the $y$ axis direction and preferably concentric with the $y$ axis. The precession angle of the gyroscope is detected as a phase shift of a 1 kc. signal induced in rotor coil 41, fixed to one end of axle 40, by stator coil 42. This phase shifted 1 kc. signal is fed from rotor coil 41 via brush 43 to amplifier 44 and in turn to phase comparing network 45 where it is phase compared with the signal from a 1 kc. oscillator 46 which also energizes coil 42. The output of network 45 is a pulsating D.C. signal whose D.C. sign and magnitude are indicative of the phase difference between input signals. This output is filtered by 1 kc. filter 47 and fed to chopper 48 which is controlled by sampling pulse generator 49 generating 1 kc. chopper pulses in response to the output of 1 kc. oscillator 46. The chopped D.C. output signal from chopper 48 is then fed to each of similar reference voltage multivibrators 50 and 51 which are also fed D.C. signals from battery 52, multivibrator 50 being fed a positive voltage from battery 52 and multivibrator 51 being fed a negative voltage from battery 52. The design and operation of multivibrators 50 and 51 may be as described on page 343, Volume 19 of Radiation Laboratory Series published by McGraw-Hill. These multivibrators each produce a signal pulse output upon receiving a pulse from chopper 48 which is, in the case of multivibrator 50, more positive than the positive battery voltage fed to multivibrator 50 or, in the case of multivibrator 51, more negative than the negative battery voltage fed to multivibrator 51. The output of multivibrator 50 energizes bistable flip-flop circuit 53a, and the output of multivibrator 51 energizes bistable flip-flop circuit 53b. Each of these flip-flop circuits, 53a and 53b, are reset simultaneously by a signal from standard pulse generator 54 via delay circuit 55. The outputs of one stage of flip-flop circuits 53a and 53b are coupled to and controlled by "and" gates 56a and 56b which gate pulses from standard pulse generator 54 and feed said gated pulses to one end or the other of torquing coil 57 which is inductively coupled to magnet 58 fixed to axle 40, thereby torquing said axle. Thus, the output of chopper 48 consisting of positive or negative pulses causes multivibrators 50 and 51 to energize flip-flop circuits 53a and 53b, respectively, when said pulses from chopper 48 exceed predetermined voltage values determined by battery 52, and when flip-flop circuits 53a and 53b are energized, gates 56a or 56b are opened allowing a signal pulse from standard pulse generator 54 to be applied to one side or the other or torquing coil 57 causing axle 40 to be torqued in such a direction as to oppose the tendency of gyroscope housing 37 to precess in response to a rotation of body 1 about the $x$ axis. The outputs of "and" gates 56a and 56b are also fed to "or" gate circuit 59 whose output signal consists of $\delta_x$ pulses which are fed to the matrix computer shown in FIG. 4. The sign of the $\delta_x$ pulse is represented by the signal output $\sigma_x$ from one stage of bistable flip-flop circuit 60, which is also coupled to the outputs of "and" gates 56a and 56b.

Referring next to FIGS. 7 and 8, there are shown a block diagram of the electronic clock and a wave form diagram of some of the pulses issuing therefrom and employed in the matrix computer. The clock shown in FIG. 7 is comprised of a 1 mc. oscillator 61 feeding a pulse generator 62 producing 1 $\mu$sec. spaced pulses which is the basic clock pulse, hereinafter referred to at $T_n$, where $n$ is an integer from 1 to 48. These basic clock pulses are fed to all the dynamic logic circuits in the manner hereinabove described with reference to FIG. 5b. The output from pulse generator 62 is fed to ring counter 63 having forty-eight stages, the output of each stage being denoted by numbers 1 to 48 some of which are shown as output terminals from 63. Ring counter 63 may be similar to the device shown at the bottom of page 343 of Millman and Taub, "Pulse and Digital Circuits" published 1956 by McGraw-Hill, except that the ring counter employed in this invention must have many more stages than shown in the reference. The outputs from stages 1, 8, 16, 24, 32, and 40 of ring counter 63 are each fed via diodes 64 to single input bistable flip-flop circuit 65 so that one side, say for example, 65a of flip-flop circuit 65, produces an output signal in response to an output from stages 1, 16, and 32 of ring counter 63 and the other side of flip-flop circuit 65, say for example 65b, produces an output signal each time stages 8, 24, and 40 of ring counter 63 are caused to conduct. The outputs from 65a and 65b are fed to "and" circuits 66 and 67, respectively, via delay circuits 68 and 69, respectively. These "and" circuits, 66 and 67, serve to gate pulses from pulse generator 62 to yield the $T_w$ and $\overline{T}_w$ waveform pulses shown in the waveform diagram FIG. 8 and discussed with reference to matrix computer shown in FIG. 4. Delay circuits 68 and 69 serve to delay the openings of "and" gates 66 and 67 in response to signals from stages 1, 16 and 32 and signals from stages 8, 24 and 40, respectively, so that gates 66 and 67 open one $\mu$sec. after the signals from their associated stages of counter 63. The output of stage 48 of ring counter 63 is fed back to stage 1 of ring counter 63 to condition stage 1 so that the next pulse from pulse generator 62 will begin another count of ring counter 63. The ouput of stage 48 is also fed to control "and" gate 70 via delay circuit 71, thus, "and" gate 70 serves to pass every forty-eight pulse from pulse generator 62. The output from stage 1 of ring counter 63 serves to control "and" gate 73 and is fed to said gate via delay circuit 74, thus, gate 73 passes every first pulse from pulse generator 62 thereby supplying $T_1$ pulses to the matrix computer. The outputs of stages 1, 16, and 32 of ring counter 63 are also fed to the utilization device employing the matrix computer and described herein with reference to FIG. 9.

A matrix computer employing $\delta_x$, $\delta_y$ and $\delta_z$ pulses from gyroscope devices fixed to the $x$, $y$, and $z$ axes, respectively, of a body, such as shown in FIG. 1, to compute the nine coefficients $R_{ij}$ described by the nine Equations M is shown in block diagram form in FIGS. 4a, 4b, and 4*c*. This computer is provided a number of timing pulses derived from the electronic clock shown in FIG. 7. These timing pulses and other waveforms in the computer are shown in FIG. 8 so that a better understanding of the operation of the matrix computer may be had. The various functions of the matrix computer are performed by dynamic circuitry, the principles of which are well-known and described in some detail in an article by R. W. Brooks on page 147 of the March 1957 issue of "Instruments and Automation." There is also some discussion of dynamic binary circuits on page 415 in "Pulse and Digital Circuits" by Millman and Taub, published by McGraw-Hill. The basic configuration of dynamic circuitry that is used in this invention to implement a typical one of the circuits shown in block diagram form in FIGS. 4*a*, 4*b*, and 4*c* is shown in FIG. 5*b*, and a gyroscope device to produce the aforementioned $\delta$ pulses, say for example $\delta_x$, is shown in FIG. 6 and discussed hereinabove.

Turning now to FIGS. 4 and 8, there is shown in FIG. 4 the three gyroscope devices 33, 34, and 35 producing pulses $\delta_x$, $\delta_y$, and $\delta_z$, respectively, and sign signals $\sigma_x$, $\sigma_y$, and $\sigma_z$, each $\delta$ pulse representing an angular rotation of $2^{-6}$ radians of body 1 about one of its axes, *x*, *y*, or *z*, and each $\sigma$ signal representing the sign or direction of the angle of rotation represented by its associated $\delta$ pulse. Consider first the effects of a pulse $\delta_x$ and a signal $\sigma_x$ from gyroscope device 33. The $\delta_x$ pulse and $\overline{T}_1$ pulses are fed to the input of dynamic circuit 75 which produces an output pulse denoted $\alpha_{75}$ which is fed back to the input. The denotation $\alpha_{75}$ in logic notation indicates an assertion output from circuit 75 upon the occurrence of the following logic function:

(P) $$\alpha_{75}=(\overline{T}_1\cdot\alpha_{75})\ \mathrm{v}\ \delta_x$$

If desired, the output of gate circuit 75 can also produce the negation of logic Equation P which is indicated by the symbol $\eta_{75}$. Obviously, the logic equation for the $\eta$ output from circuit 75 is as follows:

(Q) $$\eta_{75}=(T_1\cdot\eta_{75})\cdot\delta_x$$

The $\alpha_{75}$ output is fed to the inputs of circuit 76 as well as $T_1$, $\delta_x$, $\sigma_x$, $\overline{T}_{48}$ and the assertion output from circuit 76. Timing pulses $T_1$ and $T_{48}$ and gyroscope pulses $\delta_x$ and signal $\sigma_x$ are all shown in the waveform diagrams of FIG. 6. The logic of circuit 76 can be expressed by the following equation:

(R) $$\alpha_{76}=(\alpha_{75}\cdot T_1\cdot\sigma_x)\ \mathrm{v}\ (\overline{T}_{48}\cdot\alpha_{76})$$

The asserted output $\alpha_{75}$ is also fed to circuit 77 as well as $\overline{T}_{48}$, $T_{48}$, $\delta_x$ and the assertion output from circuit 77. The logic performed by circuit 77 is described by the following logic equation:

(S) $$\alpha_{77}=(T_1\cdot\alpha_{75})\ \mathrm{v}\ (\overline{T}_{48}\cdot\alpha_{77})$$

In other words, the operation of circuits 75 and 77 is to produce an $\alpha$ output from circuit 77, denoted $\alpha_{77}$, when a $\delta_x$ pulse has set circuit 75 into dynamic operation and circuit 75 remains in dynamic operation because a $\overline{T}_1$ pulse has not occurred. Meanwhile, upon the occurrence of a $T_{48}$ pulse, circuit 77 produces an $\alpha_{77}$ output and continues to do so provided a $T_{48}$ pulse has not arrived. Thus, referring to waveforms in FIG. 8, circuit 77 produces an output only between the times a $T_1$ pulse occurs and a $T_{48}$ pulse occurs subsequent to the occurrence of a $\delta_x$ pulse. From logic equation R, it can be seen that circuit 76 is caused to produce an output $\alpha_{76}$ upon simultaneously receiving an output from circuit 75, a $T_1$ pulse and a $\sigma_x$ signal (which is a ground level signal when $\delta_x$ represents a positive increment of rotation), and circuit 76 continues to produce an output $\alpha_{76}$ so long as no $T_{48}$ pulses occur. Circuit 76 also produces a $\eta_{76}$ output which is the negation of the $\alpha_{76}$ output. Thus, in the above instance $\alpha_{76}$ is a D.C. ground signal.

When $\delta_x$ represents a positive increment of rotation, the $\sigma_x$ signal is positive and $\alpha_{76}$ is composed of clock pulses each swinging negative from ground potential in the manner hereinabove described with reference to FIG. 5*c*.

Meanwhile, gyro devices 34 and 35 each feed pulses and signal into systems identical to that fed by gyro device 33. In the case of gyro device 34, they are circuits 78, 79, and 80 which are identical in structure and operation to circuits 75, 76, and 77, respectively, and in the case of gyro device 35 they are circuits 81, 82, and 83 which are also identical in structure and operation to circuits 75, 76, and 77, respectively. Thus, circuit outputs $\alpha_{77}$, $\alpha_{80}$, and $\alpha_{83}$ are representative of gyro device output pulses $\delta_x$, $\delta_y$, and $\delta_z$, and circuit outputs $\alpha_{76}$, $\alpha_{79}$ and $\alpha_{82}$ are representative of $\sigma_x$, $\sigma_y$, and $\sigma_z$ signals from gyro devices 33, 34, and 35, respectively.

Consider next the operation of dynamic storage devices 84, 85, and 86 which are identical in construction and operation, each serving to store three different ones of the nine coefficients $R_{ij}$ expressed in Equations M. Since these storage devices are identical in construction and operation, the details of structure and operation of device 84 only will be described herein. Device 84 is comprised of a magnetostrictive delay line 87 which serves to delay each pulse input from coil 88, inductively coupled to one end thereof, 48 microseconds before it is detected at coil 89, which is inductively coupled to the other end, and fed to amplifier 90. Since the dynamic system herein described runs at one megacycle as established by the electronic clock, magnetostrictive delay line 87 is capable of storing 48 bits of information at any particular instant, which in this embodiment describe three different numbers each of 16 binary bits. Three such numbers, each comprised of 16 binary bits are shown in time relationship and denoted inputs to amplifier 90 in the waveform diagrams of FIG. 8 wherein it is seen that the first or most insignificant binary bit of the first number coincides in time with timing pulse $T_1$. Pick up coil 91 is also inductively coupled to magnetostrictive delay line 87 at such a point that it detects a given pulse introduced by coil 88, eight microseconds before that same pulse is detected by coil 89 and feeds this pulse to amplifier 92. The output of amplifier 92 is fed to dynamic fill-in circuit 93 which serves to blank out the least significant first 8 binary bits of each of the three numbers dynamically stored in magnetostrictive delay line 87 by employing what are herein referred to as fill-in pulses $T_w$ and $\overline{T}_w$ from the electronic clock. The logic of circuit 93 may be expressed by the following logic equation:

(U) $$\alpha_{93}=\Delta R_{1x}=(R_{1x}.T_w)\ \mathrm{v}\ (\alpha_{93}.\overline{T}_w)$$

As seen in Equation U above, the assertion output from circuit 93, $\alpha_{93}$ is equivalent to $\Delta R_{1x}$ which is an increment of 16 bit binary number $R_{1x}$ stored in magnetostrictive device 87 and is shown in waveform diagram in FIG. 8 where it is denoted $\alpha_{93}$. As expressed by logic Equation U above, the output $\alpha_{93}$ consists of a pulse upon the simultaneous arrival at the input to circuit 93 of a $T_w$ pulse and one binary bit pulse from number $R_{1x}$ or upon the simultaneous arrival of an $\alpha_{93}$ pulse and a $\overline{T}_w$ pulse at the input to circuit 93. Thus, the effect of circuit 93 is to insert pulses in place of the first 8 least significant binary bits of each of the three numbers $R_{Ix}$, $R_{IIx}$ and $R_{IIIx}$ which are stored serially in magnetostrictive delay line 87 in the manner hereinabove described. Meanwhile, magnetostrictive storage devices 85 and 86 with fill-in circuits 94 and 95, respectively, function in the same manner as magnetostrictive storage device 84 and circuit 93. Circuits 94 and 95 form the same functions in computing the factors $\Delta R_{1y}$ and $\Delta R_{1z}$ as does circuit 93 to compute the factors $\Delta R_{1x}$.

The operations of circuits 96 and 97 are to condition the outputs from circuits 94 and 95 in response to $\delta_y$ and $\delta_z$ signals from circuits 80 and 83 and the $\rho_y$ and $\overline{\rho_y}$ and $\rho_z$ and $\overline{\rho_z}$ signals from circuits 79 and 82, respectively, so as to compute the factors $\Delta R_{Ix}$, $\Delta R_{IIx}$ and $\Delta R_{IIIx}$ associated with device 87 and expressed in Equations K. For example, assume that at a given instant a 16-bit word $R_{Ix}$ is being fed through to circuit 93 in serial form, the least significant bit first, while at the same given instant, numbers $R_{Iy}$ and $R_{Iz}$ are being fed to circuits 94 and 95 respectively. The first eight least significant bits of each of these numbers are removed in circuits 93, 94 and 95 and pulses substituted therefor. Thus, the logic equations at said instant which are performed by circuits 93, 94, and 95 are expressed by Equations V.

$$\text{(V)}\qquad \begin{aligned} \alpha_{93}&=\Delta R_{Ix}=(R_{Ix}.T_w)\ \text{v}\ (\alpha_{93}.\overline{T}_w)\\ \alpha_{94}&=\Delta R_{Iy}=(R_{Iy}.T_w)\ \text{v}\ (\alpha_{94}.\overline{T}_w)\\ \alpha_{95}&=\Delta R_{Iz}=(R_{Iz}.T_w)\ \text{v}\ (\alpha_{95}.\overline{T}_w) \end{aligned}$$

The purpose of circuits 96 and 97 is to feed binary numbers $\Delta R_{Iz}$ and $\Delta R_{Iy}$, respectively, to dynamic serial adder circuits 98 and 99, via delay circuits 100 and 101 respectively, in response to the outputs of circuits 80 and 83, respectively, as applied to circuits 96 and 97, respectively. The function of dynamic serial adder circuits 98 and 99, at said given instant, is to add or subtract $\Delta R_{Iz}$ and $\Delta R_{Iy}$ to $\Delta R_{Ix}$ upon the occurrence of $\delta_y$ and $\delta_z$ pulses, thereby performing the operation described by one of Equations K and one of Equations M. As stated hereinabove, coil 91 detects a pulse binary bit eight microseconds before coil 89 detects the same bit, and since the numbers stored in the magnetostrictive device 87 in serial form one after the other are detected by coils 89 and 91, the least significant binary bit first, the number detected by coil 91, say for example $\Delta R_{Ix}$, will actually be $2^{-8}$ times the number $R_{Ix}$ detected by coil 89. Likewise and in the same manner, the binary serial numbers fed to circuits 94 and 95, namely, $R_{Iy}$ and $R_{Iz}$, will be reduced by a factor $2^{-8}$. The purpose of delay circuits 100 and 101 is to delay output signals from circuits 96 and 97 respectively so that the binary serial numbers fed from them to adders 98 and 99, $\Delta R_{Iz}$ and $\Delta R_{Iy}$, respectively, are shifted six microseconds with respect to the number $R_{Ix}$ to which they are added or subtracted. Thus, delay circuits 100 and 101 add whatever delay is necessary along with the inherent delays in circuits 94, 95, 96 and 97 to cause the six microsecond shift so that the significance of each $\delta$ pulse of $2^{-6}$ radians is maintained. The logic performed by circuits 96 and 97 at said given instant is expressed by the following two logic equations:

$$\text{(W)}\qquad \alpha_{96}=(\delta_y.\sigma_y.\overline{\Delta R_{Iz}})\ \text{v}\ (\delta_y.\sigma_y.\Delta R_{Iz})$$

$$\text{(X)}\qquad \alpha_{97}=(\delta_z.\sigma_z.\overline{\Delta R_{Iy}})\ \text{v}\ (\delta_z.\sigma_z.\Delta R_{Iy})$$

As can be seen from logic equation W above, an assertive output from circuit 96, $\alpha_{96}$, indicative of $\overline{\Delta} R_{Iz}$ occurs when, simultaneously, clock pulses indicative of $\delta_x$ from circuit 77, a ground signal $\sigma_x$ from circuit 76 and $\overline{\Delta} R_{Iz}$ pulses from circuit 95 arrive at the input of circuit 96. This assertive output $\alpha_{98}$, indicative of $\Delta R_{Iz}$ and its negation $\eta_{96}$ which are both fed to serial adder 98, has the effect of subtracting the number $\Delta R_{Iz}$ from the number $\Delta R_{Ix}$ also fed to adder 98 from amplifier 90. On the other hand, if the $\sigma_x$ signal input to circuit 96 is not a ground signal, as when its associated $\delta_x$ pulse indicates a positive increment of rotation of body 1, but rather when $\sigma_x$ is comprised of negative clock pulses (swinging negative from ground), then the complement of serial binary number $\overline{\Delta} R_{Iz}$ or $\Delta R_{Iz}$ will be added to the number $R_{Ix}$ by the action of adder 98.

Circuit 97 operates in a manner similar to circuit 96 to condition number $\Delta R_{Iy}$ in response to $\delta_z$ pulses and their signs are represented by $\sigma_z$ signals, so that the number $\Delta R_{Iy}$ is added or substrated to the output of adder 98 by the action of adder 99 to thereby complete computation of the first one of Equations K and the first one of Equations M.

Binary serial adders 98 and 99 associated with magnetostrictive storage device 84, as well as the other adders shown in FIG. 4 associated with storage devices 85 and 86, may operate as any of the high speed serial adders known to the art such as, for example, described on page 461 of the March 1957 edition of "Instruments and Automation" published by the Instruments Publishing Company of Pontiac, Illinois.

Turning next to FIG. 9, there is shown one utilization of the matrix computer described above with reference to FIGS. 4*a*, 4*b*, and 4*c*. The three magnetostrictive storage devices 84, 85 and 86 described hereinabove with reference to FIGS. 4*a*, 4*b*, and 4*c* are shown. The output of a single one of these, say for example 84, represented by the output of its associated amplifier 90, is shown in FIG. 9 feeding number separating gating circuit 102 whose output consists of three serial binary numbers $R_{Ix}$, $R_{IIx}$, and $R_{IIIx}$ transmitted via lines 103, 104 and 105 respectively to identical serial shift registers 106, 107 and 108, respectively. Gating circuit 102 gates the output from amplifier 90 in response to signals from stages 1, 16, and 32 of ring counter 63 so that serial numbers $R_{Ix}$, $R_{IIx}$, and $R_{IIIx}$ are stored in serial form in registers 106, 107 and 108, respectively, in that time sequence. The output of each of the registers consisting of 16 parallel signals each carried by a different line, are applied to parallel binary registers 109, 110, and 111, respectively, via "and" gates 112, 113, and 114, respectively. Each of "and" gates 112, 113 and 114 is comprised of 16 parallel "and" gates all of which are controlled simultaneously by the same signal. The signal controlling 16 "and" gates 112 is derived from the first stage of ring counter 63 shown in FIG. 7, while the signals controlling 16 "and" gates 113 and 114 are derived from stages 16 and 32, respectively, of counter 63. Thus, "and" gates 112, "and" gates 113 and "and" gates 114 open sequentially in that order when complete 16 bit serially binary numbers are registered in shift registers 106, 107 and 108, respectively.

The output of each of parallel registers 109, 110 and 111 consists of 16 lines, each line transmitting one binary bit and energized by the same voltage to represent a binary bit. Each one of the 16 line outputs from each parallel register is fed to a resistor, the value of said resistor being weighted in accordance with the significance of the binary bit of information feeding it. Thus, each parallel register feeds 16 weighted resistors which form the output network to a summing amplifier so that the output of said summing amplifier is an analog representation of the number stored in its associated parallel register. Accordingly, parallel registers 109, 110 and 111 feed weighted resistors 115, 116 and 117 which in turn form the input networks for summing amplifiers 118, 119 and 120, respectively.

The outputs of summing amplifiers 118, 119 and 120 are fed to analog multipliers 121, 122 and 123, respectively. Integrating accelerometers 124, 125 and 126, which are located in body 1 so as to yield signals indicative of the velocity of body 1 in the direction of the *x*, *y*, and *z* axes, respectively, also feed signals to analog multipliers 121, 122 and 123, respectively, the latter two receiving $R_{Iy}$ and $R_{Iz}$ analog signals from systems similar to that shown in FIG. 9. Thus, the purpose of these analog multipliers is to weight the velocities of body 1, along its *x*, *y*, and *z* axes, by multiplying each of said velocities by the register number representing the cosine of the angle between its associated axis, *x*, *y*, or *z*, and reference frame axis I, yielding three products indicative of the projections of said velocities on the I axis. These products may then be summed to yield the velocity of body 1 in the direction of reference frame axis I. Accordingly, the outputs from analog multipliers 121, 122 and 123 are fed to summing amplifier 127 whose output denoted $V_I$ is indicative of the velocity of body 1 in the direction of reference frame axis I and is indicated on meter 128. The output of amplifier 127 is also fed to integrator 129 whose output which is indicative of distance traveled by body 1 in the direction of reference frame axis I, denoted $S_I$, is applied to meter 129 which indicates said distance.

Each of serial storage devices 85 and 86 feed into identical systems as does device 84 to provide an indication of the velocity and displacement of body 1 in the directions of reference frame axes II and III, respectively, on similar velocity, V, and displacement, S, meters. Thus, an operator observing said meters may establish the position of body 1 in the inertial reference frame. Obviously, velocities of a body along the axis of an inertial reference frame are of utility to navigate said body in inertial space and also to navigate said body in any other frame of reference whose orientation with regard to the inertial frame of reference is known, such as, for example, the earth frame of reference.

While I have described above the principles of my invention in connection with specific apparatus, it is to be clearly understood that this description is made only by way of example and not as a limitation to the scope of my invention as set forth in the objects thereof and in the accompanying claims.

I claim:

1. A system for providing information representing the attitude of a body with respect to the three axes of a reference spatial frame comprising a plurality of rotation sensitive devices each sensitive to rotations of said body about at least one of three orthogonal body axes and each producing signals representative of equal increments of rotation of said body about a different one of said body axes, binary number storage means for storing nine numbers each representing a function of a different angle between one of said body axes and one of said reference axes, adding and subtracting means coupled to each of said storage means, weighting means coupled to each of said storage means and means coupling the output of said weighting means from each of said storage means to the adding and subtracting means coupled to others of said storage means and means coupling predetermined ones of said signals to each of said coupling means so that weighted outputs from each of said storage means are combined by said adding and subtracting means with numbers stored in each of said other storage means in response to predetermined ones of said signals to thereby continuously represent the attitude of said body with respect to said reference spatial frame.

2. A system for providing information representing the attitude of three orthogonal axes of a body with respect to three orthogonal axes of a reference spatial frame comprising a plurality of rotation sensitive devices each producing pulses representative of equal angles of rotation of said body about different ones of said body axes, binary number storage means for storing nine numbers each representing the cosine of the angle between one of said body axes and one of said reference axes, adding and subtracting means coupled to each of said number storage means, number weighting means coupled to each of said storage means, means coupling the output of each of said weighting means associated with each of said storage means with adding and subtracting means associated with others of said storage means and means for applying predetermined ones of said signals to said coupling means so that weighted values of each of said numbers are combined with others of said numbers to thereby continuously provide stored numbers representative of the attitude of said body with respect to said reference frame.

3. A system as in claim 2 wherein said plurality of rotation sensitive devices each comprises as its sensitive element a gyroscope each orientated so as to be sensitive to rotations of said body about at least one of said body axes.

4. A system for providing information representing the orientation of three orthogonal axes fixed to a body with respect to three orthogonal axes of a spatial reference frame comprising a plurality of gyroscope devices each fixed to said body so as to be responsive to rotations of said body about different ones of said body axes, different signal producing means coupled to each of said gyroscope devices for producing signals or equal increments each increment representing a given angle of rotation of said body about one of said body axes, a plurality of serial binary number storage means each storing three different numbers representing the cosines of angles between one of said body axes and different ones of said reference frame axes and means for adding and subtracting weighted values of said numbers from each of said storage means to predetermined ones of said numbers in others of said storage means in response to predetermined ones of said signals so that said numbers continually represent the attitude of said body with respect to said reference frame.

5. A system as in claim 4 wherein each of said gyroscope devices comprises a single degree of freedom gyroscope having rotation sensing means and torquing means coupled to its output axle, means coupling said rotation sensing and said torquing means whereby said axle is torqued in response to the output of said rotation sensing means maintaining said gyroscope essentially fixed with respect to said body when said body rotates and means responsive to said coupling means for producing said signals representative of equal increments of rotation.

6. A system as in claim 4 wherein each of said serial binary storage means comprises a magnetostrictive delay line having an input end and an output end and means coupling said ends whereby three serial binary numbers may be represented in each magnetostrictive delay line at a given instant.

7. A system as in claim 4 further including clock means for producing a plurality of different signals for synchronizing the operation of each of said serial binary storage means.

8. A system for providing numbers representative of the orientation of orthogonal body axes fixed to a body with respect to orthogonal reference axes of a spatial reference frame comprising a plurality of gyroscope devices each for sensing rotations of said body about a different one of said body axes and each producing pulses representative of equal increments of rotation of said body about one of said body axes and a signal representative of the sign of said rotation, a plurality of serial binary number storage means each comprising a magnetostrictive delay line having an input and an output with dynamic serial adding and subtracting means coupling said input and output and number weighting means coupled to said delay line for producing equally weighted values of each of the numbers stored therein, said weighting bearing a fixed relationship to said equal increments, a plurality of pairs of gating means, one gate of each pair coupling the output of one weighting means associated with one delay line to the adding means associated with another delay line and the other coupling the output of the same said weighting means to the subtracting means associated with a third delay line and different dynamic circuit means coupling said pulses and signals from each of said gyroscope devices to a different pair of said gating means so that each of said weighted numbers is added to certain of said stored numbers and subtracted from others in response to pulses and signals from certain of said gyroscope devices to thereby continuously provide stored numbers representative of the orientation of said body axes with respect to said reference axes.

9. A system for detecting, computing and storing information representing the attitude of a body with respect to a reference frame comprising means for sensing rotations of said body about axes fixed to said body, means, coupled to said sensing means, for producing digital signals representative of said rotations, a plurality of storage means each for storing signals representing a part of said information, a plurality of gating means each coupling the output of one of said storage means to the input of another storage means, and means, coupled to said gating means and responsive to said rotation representing signals for altering the information representing signals in each storage means in proportion to the information representing signals in other of said storage means.

10. A system as in claim 9 in which there are twice as many gating means as storage means, the output of each storage means being coupled to the input of each of the other storage means by a different one of said gating means.

References Cited by the Examiner

UNITED STATES PATENTS

| | | | |
|---|---|---|---|
| 2,807,794 | 9/57 | Taylor | 33—204 |
| 3,049,294 | 8/62 | Newell | 244—14 XR |

FOREIGN PATENTS

| | | |
|---|---|---|
| 1,352 | 6/58 | Great Britain. |

MALCOLM A. MORRISON, *Primary Examiner.*

CHESTER L. JUSTUS, *Examiner.*